(12) United States Patent
Xue et al.

(10) Patent No.: US 7,777,742 B2
(45) Date of Patent: Aug. 17, 2010

(54) SYSTEMS AND METHODS OF NON-RIGID VOLUME REGISTRATION

(75) Inventors: Daqing Xue, Plainsboro, NJ (US); Min Xie, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 783 days.

(21) Appl. No.: 11/623,344

(22) Filed: Jan. 16, 2007

(65) Prior Publication Data

US 2008/0043017 A1 Feb. 21, 2008

Related U.S. Application Data

(60) Provisional application No. 60/839,069, filed on Aug. 21, 2006.

(51) Int. Cl.
*G06T 15/00* (2006.01)
(52) U.S. Cl. .................. 345/424; 345/428; 345/440; 707/791; 707/797; 707/798
(58) Field of Classification Search .............. 345/424, 345/428, 440; 707/1, 2, 791, 797, 798
See application file for complete search history.

(56) References Cited

U.S. PATENT DOCUMENTS

| 7,567,694 B2* | 7/2009 | Lu et al. ............... 382/128 |
| 2005/0285858 A1 | 12/2005 | Yang et al. | |

OTHER PUBLICATIONS

Wells et al., Multi-modal Volume Registration by Maximization of Mutual Information, Medical Image Analysis, vol. 1, No. 1, pp. 35-51, 1996.*

Szeliski et al., Matching 3-D Anatomical Surfaces with Non-Rigid Deformations using Octree-Splines, International Journal of Computer Vision 18(2), pp. 172-186, 1996.*

"Optical Models for Direct Volume Rendering", Nelson Max, University of California, Davis, and Lawrence Livermore National Laboratory.

"Display of Surfaces from Volume Data", Marc Levoy, Jun. 1987 (revised Feb. 1988); IEEE Computer Graphics and Applications, 8(5): 29-37, 1988.

"Volume Rendering by Adaptive Refinement", Marc Levoy, Jun. 1988 (revised Jan. 1989), Computer Science Department, University of North Carolina, Chapel Hill.

* cited by examiner

*Primary Examiner*—Phu Nguyen
(74) *Attorney, Agent, or Firm*—Peter L. Kendall

(57) ABSTRACT

A method and system of volume deformation, including accessing a tree structure for a set of deformation maps. The tree structure is traversed for each voxel in an original volume and each voxel is transformed according to each deformation map corresponding to a node of the tree structure until the entire original volume is deformed into reference volume space. Also, a method and system of generating an ordered map tree structure, including identifying a root node of a bounding box, the bounding box being a union of the root node's descendants. Child nodes are identified for each node, the child nodes being ordered so that a left child is applied before a corresponding right child, wherein each child node contains a deformation map and a corresponding bounding box. Each path originating from the root node corresponds to a complete deformation map sequence, and when a portion of two deformation maps overlap, the deformation map having a lower priority is a child of the deformation map having a higher priority.

15 Claims, 10 Drawing Sheets

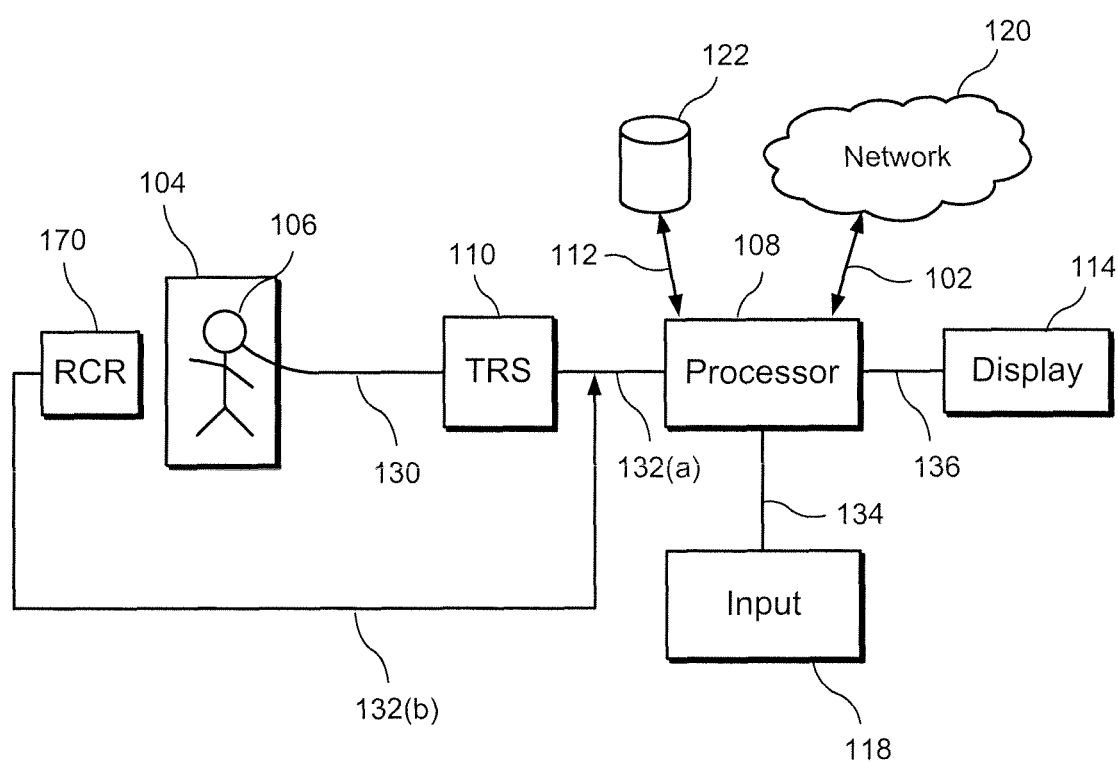
F I G. 1

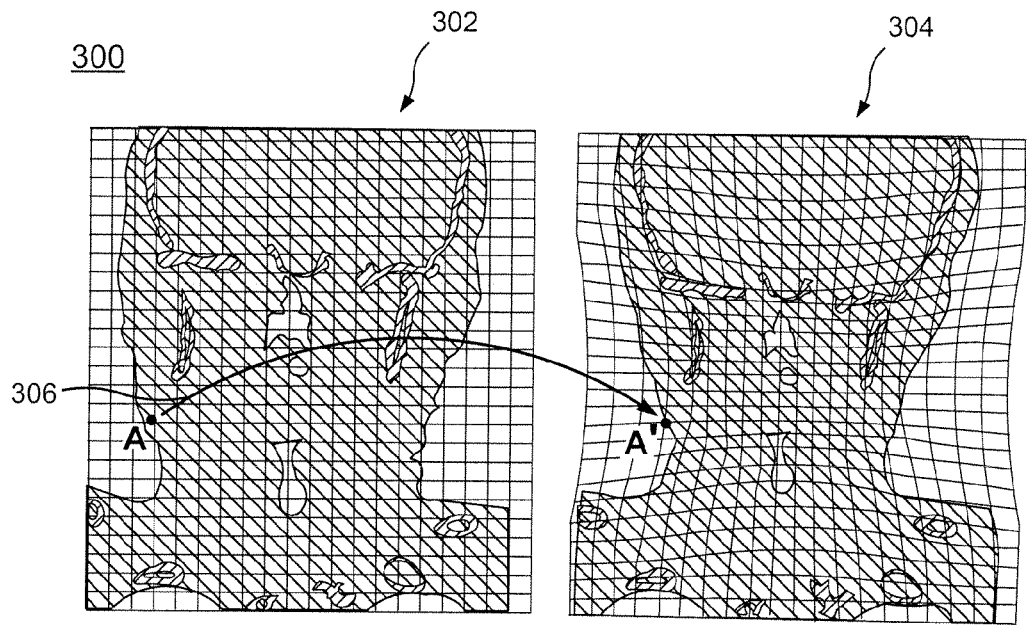
F I G. 3A   F I G. 3B
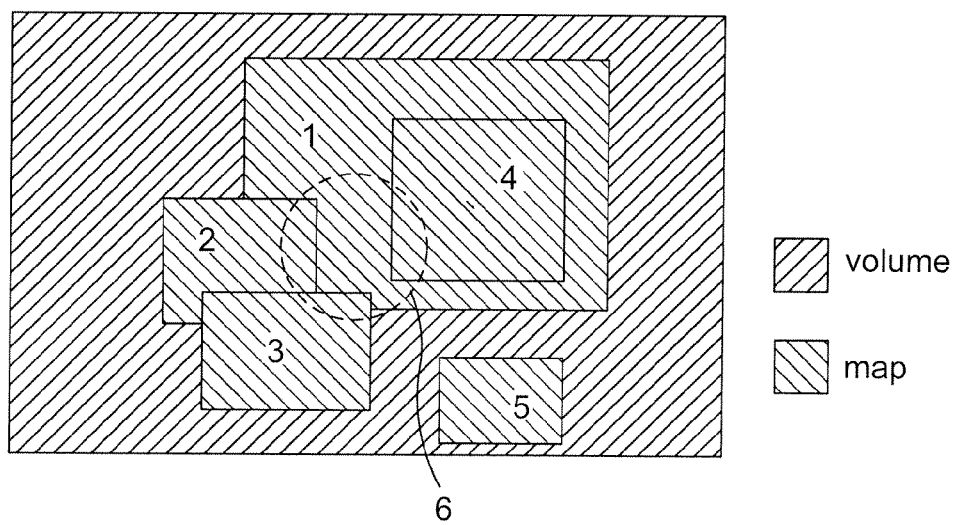
F I G. 4

900

```
Function BuildMapTree(MapList)
        RootNode.boundingBox ⟵ Φ
For each map, m, in MapList in the deformation order
        RootNode.boundingBox ⟵ RootNode.boundingBox U m.boundingBox
        AddNode(RootNode, m)
    Endfor
EndFunc.

Function AddNode(ParentNode, NewNode)
    if ParentNode.boundingBox intersects NewNode.boundingBox
        if ParentNode is leaf
            Add NewNode in ParentNode.childConteiner;
        else
          // recursively add the map
          For each child node, n, according to their deformation order
          in ParentNode.childContainer
          do
              AddNode(n, NewNode),
              if NewNode is fully inside in child n.boundingBox
                  return;
              Endif
          Endfor if NewNode is directly overlapped with ParentNode
            Add NewNode in ParentNode.childConteiner;
                Endif
            Endif
        Endif
    Endif
EndFunc.
```

FIG. 9

SYSTEMS AND METHODS OF NON-RIGID VOLUME REGISTRATION

CROSS-REFERENCE TO RELATED APPLICATIONS

This application claims a priority benefit to provisional application Ser. No. 60/839,069, filed on Aug. 21, 2006 and entitled "An ordered map tree structure based fast multi-deformation map traversal," which is hereby incorporated by reference in its entirety herein.

BACKGROUND

1. Field of the Invention

This invention relates generally to volume registration for computer-aided diagnosis (CAD). More specifically, the present invention is directed to systems and methods of non-rigid volume registration using optimized ordered-map tree traversal.

2. Background Discussion

Volume registration is a widely used technology for computer-aided diagnosis (CAD). For instance, by registering images from different modalities, such as computed tomography (CT) and positron emission tomography (PET), radiologists can combine information from different medical imaging technologies for better diagnosis. By registering images before and after treatment, radiologists can evaluate the effectiveness of treatment and adjust the treatment plan accordingly.

Non-rigid volume registration is typically used to register soft tissues where the position and shape of the tissues can change between two separate scanning procedures. To make a proper registration, the soft tissue in the original volume needs to be deformed to match the reference volume. Unlike rigid registration, the transformation in non-rigid registration cannot be globally defined. Each voxel (pixel) position in the original volume has its own transformation. The individual transformations form a three dimensional map, referred to as a deformation map. Each entry of the deformation map is a displacement vector that translates the voxel position from the original volume space to reference volume space and vice versa. To constrain the deformation region, a bounding box is used to define the deformation region.

Conventional techniques of non-rigid volume registration perform exhaustive "boundary checking" of each deformation map for each voxel, which is a very time consuming process that makes "on-the-fly" volume registration difficult or impossible.

Therefore, it would be an advancement in the state of the art to provide a system and method of non-rigid volume registration that would permit "on-the-fly" deformation map traversal and subsequently "on-the-fly" volume registration.

SUMMARY

Thus, the present invention is directed to systems and methods of non-rigid volume registration using optimized ordered-map tree traversal.

Accordingly, one embodiment of the present invention is directed to a method of volume deformation. This method (hereinafter, "the method") includes accessing a tree structure for a set of deformation maps. The tree structure is traversed for each voxel in an original volume and each voxel is transformed according to each deformation map corresponding to a node of the tree structure until the entire original volume is deformed into reference volume space.

Another embodiment of the present invention is directed to the method described above and also includes generating the tree structure for the set of deformation maps.

Yet another embodiment of the present invention is directed to the method described above wherein the step of generating the ordered map tree structure also includes identifying a root node of a bounding box, the bounding box being a union of the root node's descendants. Also child nodes for each node are identified. The child nodes are ordered so that a left child is applied before a corresponding right child, wherein each child node contains a deformation map and a corresponding bounding box. Each path originates from the root node corresponding to a complete deformation map sequence. When a portion of two deformation maps overlap, the deformation map having a lower priority is a child of the deformation map having a higher priority.

Yet another embodiment of the present invention is directed to the method described above and also includes optimizing the tree structure for the set of deformation maps.

Yet another embodiment of the present invention is directed to the method described above wherein the step of optimizing the tree structure also includes accessing the ordered map tree structure containing the set of deformation maps for the original volume. Paths of the ordered map tree structure are sorted so that a path with a highest probability is listed first in the ordered map tree structure. An optimized ordered map tree structure is output, thereby reducing deformation map searching time for each voxel in the original volume.

Yet another embodiment of the present invention is directed to the method described above wherein the step of traversing the tree structure also includes accessing a root node of the tree structure. A determination is made whether a child node on a left side has a bounding box covering a voxel. When the bounding box of the child node does not cover the voxel, right child nodes are examined until a child node is found that covers the voxel. The voxel is transformed according to a transformation map at the child node. A determination is made when an end-of-path is reached by evaluating child nodes of said child node. When no child node is found with a deformation map that covers the voxel, the method is terminated.

Yet another embodiment of the present invention is directed to a method of generating an ordered map tree structure. This method includes identifying a root node of a bounding box, the bounding box being a union of the root node's descendants. Child nodes are identified for each node, the child nodes being ordered so that a left child is applied before a corresponding right child. Each child node contains a deformation map and a corresponding bounding box, and each path originating from the root node corresponds to a complete deformation map sequence. When a portion of two deformation maps overlap, the deformation map having a lower priority is a child of the deformation map having a higher priority.

Yet another embodiment of the present invention is directed to the method described above and also includes accessing an ordered map tree structure containing a set of deformation maps for an original volume. Paths of the ordered map tree structure are sorted so that a path with a highest probability is listed first in the ordered map tree structure. An optimized ordered map tree structure is output, thereby reducing deformation map searching time for each voxel in the original volume.

Yet another embodiment of the present invention is directed to a method of traversing a tree structure. This method includes accessing a root node of the tree structure and detecting whether a child node on a left side has a bounding box covering a voxel. When the bounding box of the child node does not cover the voxel, moving right until a child node is found that covers the voxel. The voxel is transformed according to a transformation map at the child node. An end-of-path determination is made by evaluating child nodes of the child node; and terminating when no child node is found with a deformation map that covers the voxel.

Yet another embodiment of the present invention is directed to a method of optimizing an ordered map tree structure. This method includes accessing an ordered map tree structure containing a set of deformation maps for an original volume. Paths of the ordered map tree structure are sorted so that a path with a highest probability is listed first in the ordered map tree structure. An optimized ordered map tree structure is output, thereby reducing deformation map searching time for each voxel in the original volume.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 illustrates a medical imaging system utilizing the present invention;

FIGS. 3A and 3B illustrate an example of non-rigid volume deformation;

FIG. 4 illustrates a set of deformation maps for an original volume;

FIG. 9 is an example of pseudocode for generating an ordered-map tree structure from a set of deformation maps;

DETAILED DESCRIPTION

Figure 2:
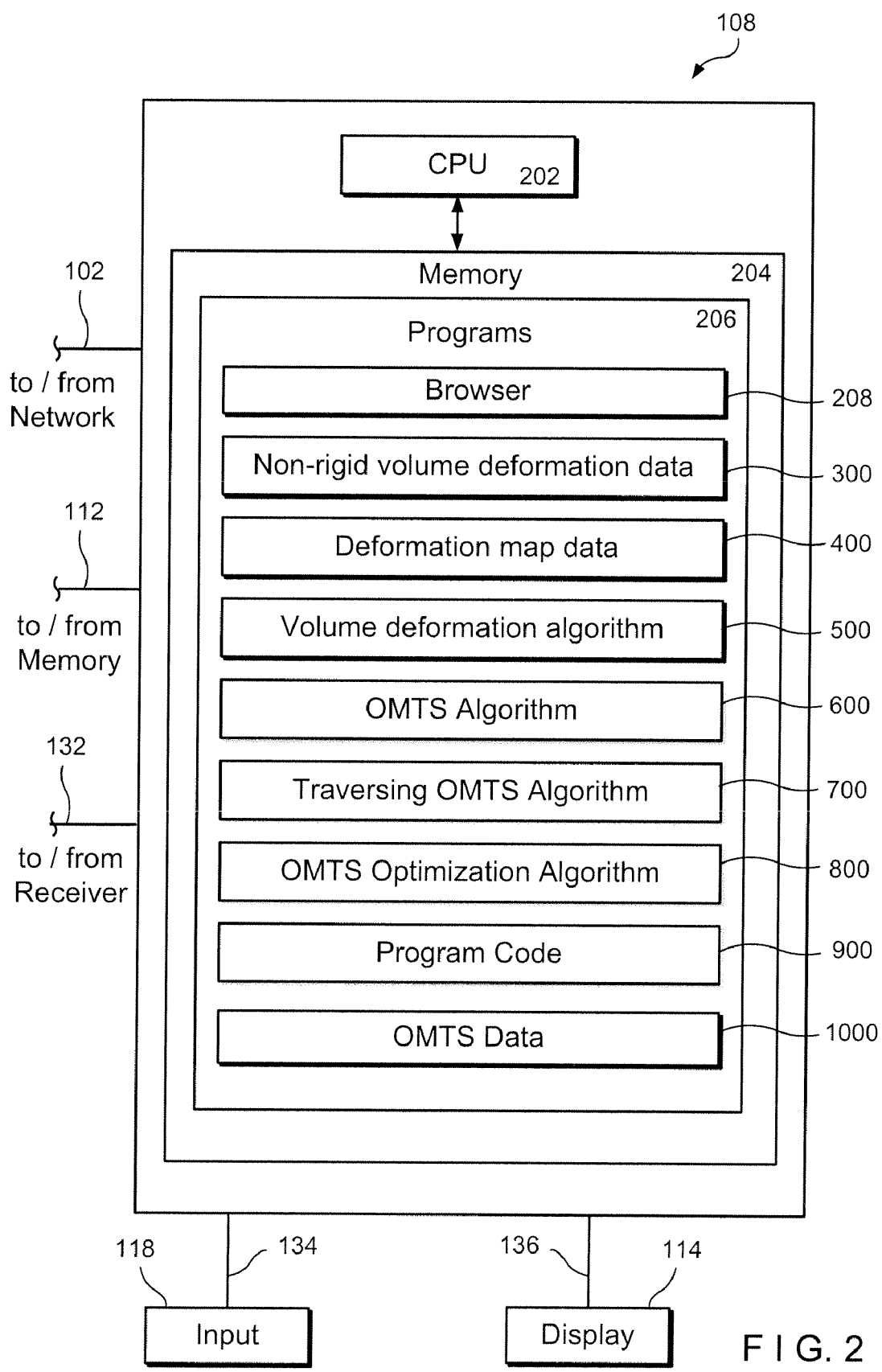
FIG. 2 illustrates a processing apparatus that may be used with the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The embodiments of the present invention are readily applied to fluoroscopic imaging, which utilizes low dose x-rays per image. Furthermore, fluoroscopic images (or road-mapping, which is a subtraction type of fluoroscopic imaging) may also be used to inject contrast media, adhesive materials, or other materials to block or fill blood vessels. Furthermore, non-rigid registration and deformable visualization are used in computer-aided disease diagnosis. The volume deformation uses a sequence of deformation maps to transform the voxels from the original volume space to the reference volume space. The transformation requires that the boundaries of each map be checked in a predefined order for every voxel.

A voxel ("volumetric pixel" or 3D pixel) is a volume element, representing a value on a regular grid in three dimensional space. Voxels are analogous to pixels, which represent 2D image data. Voxels are frequently used in the visualization and analysis of medical and scientific data. Some true 3D displays use voxels to describe their resolution. For example, a display might be able to show 512×512×512 voxels. As with pixels, voxels themselves typically do not contain their position in space (their coordinates); but rather, their coordinates are inferred based on their positions relative to other voxels (i.e., their positions in the data structure that makes up a single volume image). The value of a voxel may represent various properties. In CT scans, the values are expressed in Hounsfield units, representing the opacity of an imaged material to X-rays. Different units are used for MRI and ultrasound.

Traditional map traversal methods at the voxel level are very time consuming and exhaustive. In this invention, an Ordered Map Tree Structure (OMTS) based method for fast deformation map traversal is provided. The OMTS is designed so that each path in the tree represents a complete deformation sequence for the voxels covered by the deformation maps. The approach disclosed here avoids unnecessary boundary checking for those maps that do not overlap with the transforming voxel. The present invention allows for fast "on-the-fly" volume deformation.

FIG. 1 illustrates a medical imaging system 100 utilizing the present invention. Medical imaging system 100 includes a processing device 108, a display module 114, an input module 118, a transmitter module 110, remote storage 122, network 120, patient 106, examination table 104 and receiver unit 170.

A patient 106 is supported by table 104. Transmitter unit, or emitter unit, 110 and receiver unit, or detection unit, 170 produce image data related to a patient 106. The transmission unit 110 generates imaging medium 130, which may be x-rays, positrons, electrons, ultrasound or other imaging medium. The transmission unit 110 may be, for example, an x-ray emitting unit, such as an x-ray tube, and receiver unit 170 may be, for example, an x-ray detecting unit, such as an x-ray detector.

In an x-ray embodiment, the emitting unit 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit 170 is adapted to absorb and measure the emitted x-rays.

The imaging may also be implemented using Computed Tomography (CT), originally known as computed axial tomography (CAT or CT scan) and imaging techniques that uses tomography where digital geometry processing is used to generate a three dimensional image of the internals of an object from a large series of two-dimensional x-ray images taken around a single axis of rotation. An iodine dye, or other contrast material may be used to make structures and organs easier to see on the CT pictures. The dye may be used to check blood flow, find tumors, and look for other problems. Also positron emission tomography (PET) imaging may also be used. In PET imaging a short-lived radioactive tracer isotope, which decays by emitting a positron, and which has been chemically incorporated into a metabolically active molecule, is injected into the patient.

Transmitter unit, or emitting unit, 110 and receiver unit, or detection unit, 170 are coupled to processor unit 108 via communication media 132(a) and 132(b), respectively, which are used to provide image data to processing unit 108. Communication media 132 (generally) are, for example, a USB bus, IEEE bus or other wired bi-directional communication medium.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device (s), wireless processing device, personal computer (PC), desktop, notebook and the like. The processing device typically includes processing and storage modules.

The image display unit 114 is coupled to processor unit 108 via bidirectional communication medium 136, which is typically a bus or wired connection. The display unit 114 is used to display the image data generated by the system 100. The display unit 114 may be, for example, a monitor, LCD (liquid crystal display), a plasma screen, a graphical user interface (GUI) or other module adapted to display output data typically by a representation of pixels. Input module 118 is coupled to processing unit 108 via bidirectional communication medium 134, which is typically a bus or wired connection. The input module 118 may include devices such as a keyboard, mouse, track ball and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) to adjust the view, dimensions, color, font, or display characteristics. The processing module 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices.

The network 120 is, for example, any combination of linked computers, or processing devices, adapted to transfer (transmit and/or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio waves that can be picked up by Wi-Fi receivers that are attached to different computers. The network 120 is coupled to processing device 108 via wired or wireless bi-directional communication medium 102.

Memory module 122 is an electronic storage medium, such as a server, or other electronic storage repository that can store data used by system 100. The memory module 122 may include, for example, RAM, ROM, EEPROM or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bi-directional communication medium 112.

FIG. 2 illustrates a processor module 108 that may be used with the present invention. Processor module 108 includes a CPU 202 and memory 204. Also shown in FIG. 2 are the bi-directional communication media 102, 112 and 132. Display module 114 and input module 118 and communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary.

Memory module 204 is typically an electronic storage medium such as RAM, ROM, EEPROM or other memory device, such as an optical disk, optical tape, CD, or a floppy disk, a hard disk, memory stick, thumb drive, or a removable cartridge, which may be inserted into a port (e.g., a USB port)

or interconnector, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs 206, which include, for example, a web browser 208, non-rigid volume deformation image data storage module 300, deformation map data storage module 400, volume deformation algorithm storage module 500, ordered map tree algorithm 600, traversal algorithm storage module 700, ordered map tree optimization algorithm storage module 800, program code storage module 900 and ordered map tree structure storage module 1000, as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such as way that the contents of the memory are provided to the CPU 202 and/or system controller 108. Once the data has been accessed, typically by program code to fetch, or retrieve, the desired data stored in memory, it may be processed according to one or more algorithms described here.

FIGS. 3a and 3b show image data that may be stored in image data module 300 shown in FIG. 2. FIGS. 3a and 3b show an example of volume deformation 300, where image 302 is shown in FIG. 3a which is the original image in the volume and image 304 is shown in FIG. 3b, which is the deformed image in the reference volume. A displacement vector 306, D=(dx, dy, dz), translates each voxel position from the original volume space in image 302 to reference volume space in image 304 (and vice versa). The displacement vector D transforms a point A=(x, y, z) from original volume space to A'=(x', y', z') in the reference volume space, as shown by Equation 1.

$$A'=A+D \quad (1)$$

Without loss of generality, it can be assumed that the original volume, the reference volume, and the deformation maps are all defined in the world coordinate. The clinical workflow allows the user to interactively make regional corrections or refinements. Each correction creates another deformation map that covers the modified region. A voxel in the original volume 302 may go through several consecutive deformations/transformations defined by multiple maps to get to its final position in the reference volume space 304.

FIG. 4 shows an original volume 400 which is deformed by multiple deformation maps 1, 2, 3, 4, and 5 in different regions. This data may be stored in memory module 400 shown in FIG. 2. The index of the deformation map defines the order of the deformation sequence, which is followed in the common region 6 of multiple maps. A map with a bigger index indicates a lower priority. Other than the order of map sequences, the deformation maps 1, 2, 3, 4 and 5 also have different bounding boxes and resolutions. The deformation maps 1, 2, 3, 4 and 5 are discrete, and they can be in the same resolution as the original volume or in a resolution lower than the original volume. During deformation, an interpolation process is used to compute the displacement vector located between the deformation map grid points.

A bounding box defines the deformation region of a map. The relationship between deformation maps can be inclusion, exclusion, or partially overlapping. Typically, this makes "on-the-fly" traversal through multiple deformation maps time consuming. To transform any voxel from the original volume space to the reference volume space, it is useful to check the boundary conditions for every map in a predefined order. If the voxel position is within the bounding box of a map, then that map is applied to the voxel. This process is repeated for every map in the sequence until all maps are traversed. Since each map has six boundary conditions corresponding to its six sides in three-dimensional space (Xmin, Xmax, Ymin, Ymax, Zmin, Zmax), exhaustive "boundary checking" for each voxel makes traditional "on-the-fly" deformation time consuming.

According to one embodiment of the present invention, in order to speed up the process of deformation map traversal, it useful to avoid unnecessary "boundary checking" for those deformation maps that do not overlap with the transforming voxel. As described above, most of the deformation maps are regional. This gives rise to a systematic method of traversing only those deformation maps that apply to a given voxel. Accordingly, an embodiment of the present invention is a fast map traversal method based on an Ordered Map Tree Structure (OMTS). The OMTS method facilitates a traversal of a minimum number of maps during deformation, thereby increasing the speed of "on-the-fly" volume deformation.

The Ordered Map Tree Structure (OMTS) has two properties:
1. A displacement along any boundary of a deformation map should be zero.
2. After deformation, any transformed position should remain inside the bounding box of a map.

The first property ensures a smooth transition between deformed regions and the remainder of the non-deformed volume. This condition can be relaxed if the map covers the whole volume. The second property ensures that the voxels inside a map will not pierce through the boundary of the deformation region.

With these two properties, it is possible to build the OMTS by checking the bounding boxes of all of the maps in the order of the map sequence. The OMTS consists of nodes and paths, where each node represents a deformation map. The root node is the union of all maps, and is on top, or has the highest relative priority, of the OMTS. From the root node, other nodes are derived following the order of the map sequence. Two nodes are connected if they share a common region between their corresponding deformation maps. The connections form paths from top to bottom. (See FIGS. 10a and 10b for an example of an OMTS.) Each path in the OMTS indicates a deformation sequence. Given the order and the relationship of deformation maps, an OMTS can be constructed by the following properties:

1. A root node contains a bounding box which is the union of all its descendants.
2. Non-root nodes contain a deformation map and its corresponding bounding box.
3. Each path from the root node indicates a complete deformation map sequence.
4. For each node, its children are ordered so that the left child is applied to a transforming voxel before the right child (i.e., the left child always has a smaller map number).
5. If two maps overlap, the map with a larger map number should be a child of the node which contains the map with a smaller map number.

In the OMTS, each node contains all of the other nodes that overlap with it. If a map does not overlap with any other maps, that map only has one connection to the root note. If a map shares regions with several other maps, then its node has connection with every node which it overlaps.

Figure 5:
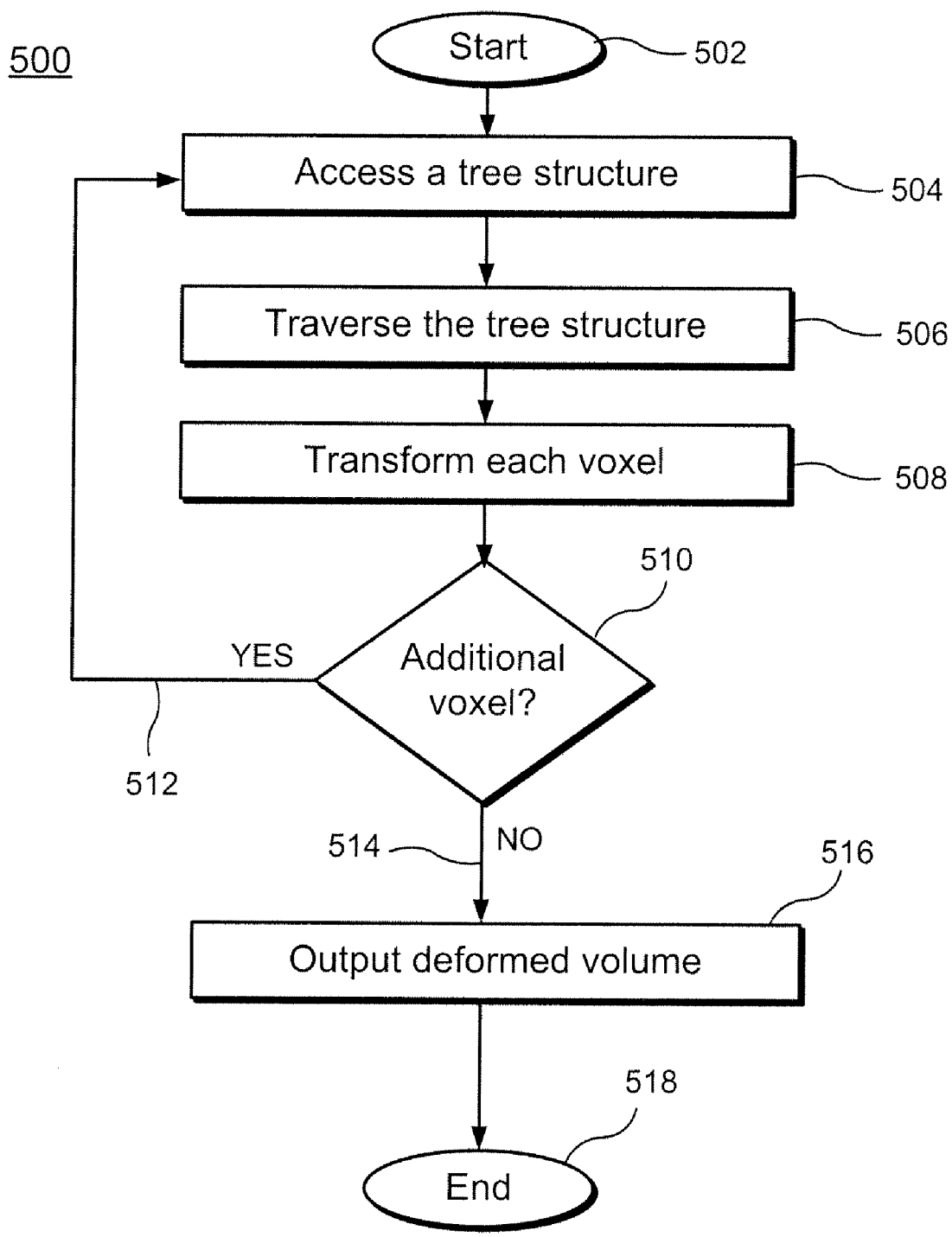
FIG. 5 shows a flowchart for non-rigid volume deformation according to an embodiment of the present invention.

By using the OMTS defined above, an embodiment of the present invention allows for faster deformation map traversal. Accordingly, an embodiment of the present invention, illustrated in FIG. 5, is a system and method of volume deformation. Process 500, which is for example, a series or steps, or program code or algorithm stored on an electronic memory or computer-readable medium. The process may also be a module that includes an electronic memory, with program code stored thereon to perform the functionality. This memory is a structural article. The process starts at step 502. A tree structure for a set of deformation maps is accessed, as shown in step 504. The tree structure is traversed for each voxel in an original volume, as shown in step 506. Each voxel is transformed according to each deformation map corresponding to a node of the tree structure until the entire original volume is deformed into reference volume space, as shown in step 508. A determination is made whether there are additional voxels, as shown in step 510. If "yes" line 512 leads to access a tree structure as shown in step 504. If there are no additional voxels, "no" line 514 shows that the deformed volume is output, as shown in step 516. The process 500 ends at step 518. The process by which the tree structure is generated is described in detail in relation to FIG. 6 below. The process by which the tree structure is traversed is described in detail in relation to FIG. 7 below. The process of optimization is shown in FIG. 8.

In one embodiment, the tree structure may be optimized before being accessed and traversed. The process by which the tree structure may be optimized is described in detail in relation to FIG. 8 below.

Figure 6:
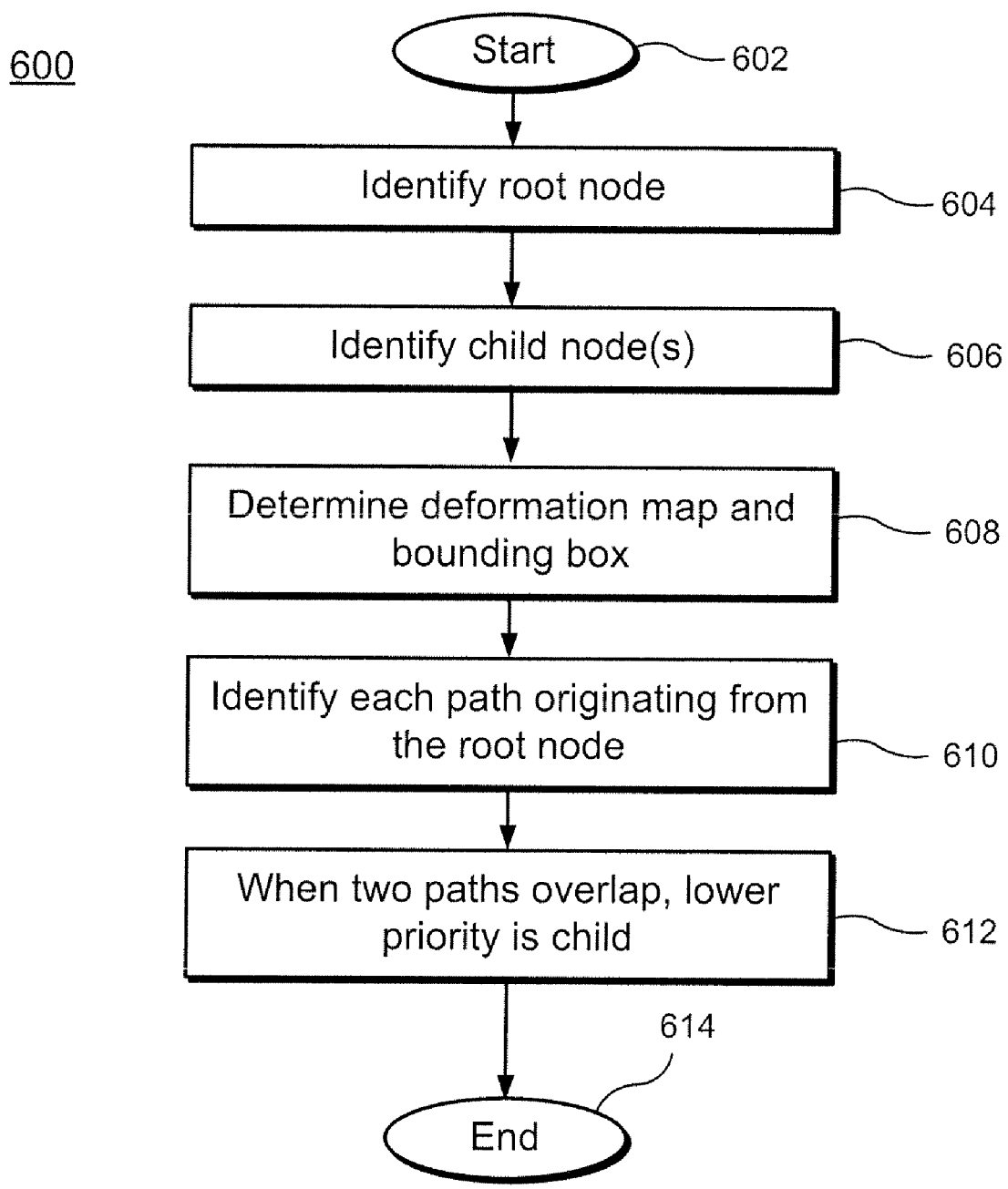
FIG. 6 shows a flowchart for generating an ordered-map tree structure according to another embodiment of the present invention.

Another embodiment of the present invention, illustrated in FIG. 6, is directed to a system and a method of generating the ordered map tree structure from the set of deformation maps. FIG. 6 shows a process 600, which is for example, a series or steps, or program code or algorithm stored on an electronic memory or computer-readable medium, used to generate the ordered map tree structure, which is later accessed in step 504 of process 500 shown in FIG. 5. The process may also be a module that includes an electronic memory, with program code stored thereon to perform the functionality. This memory is a structural article. Process 600 begins in step 602. A root node of a bounding box is identified, the bounding box being a union of the root node's descendants, as shown in step 604. Child nodes for each node are identified, the child nodes being ordered so that a left child is applied before a corresponding right child, as shown in step 606. Each child node is generated so that it contains a deformation map and a corresponding bounding box, as shown in step 608. Each path is identified that originates from the root node corresponds to a complete deformation map sequence, as shown in step 610. When a portion of two deformation maps overlap, the deformation map having a lower priority is made a child of the deformation map having a higher priority, as shown in step 612. The process 600 ends in step 614.

FIG. 9 shows sample pseudocode for process 600 to generate the ordered map tree structure from the deformation map sequence.

Figure 10B:
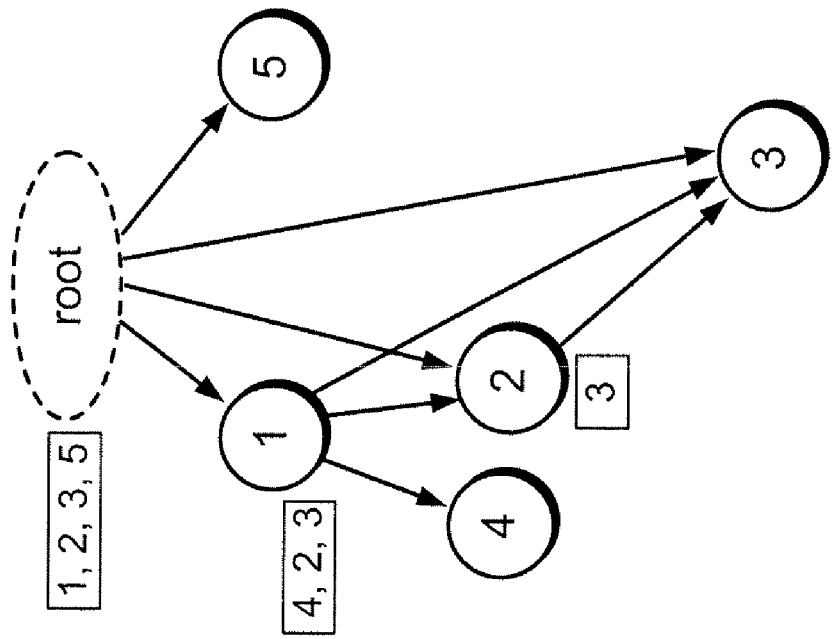
FIGS. 10a and 10b illustrate examples of ordered-map tree structures according to an embodiment of the present invention.
Figure 10A:
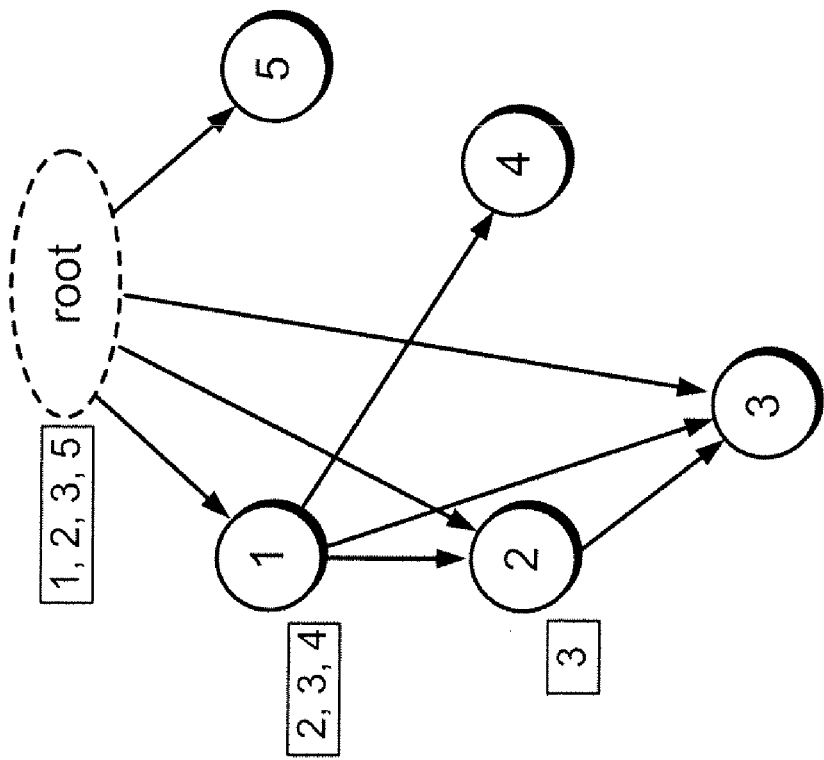

FIG. 10a shows an example of an OMTS generated by process 600 of FIG. 6 from the multiple deformation maps shown in FIG. 4. The non-leaf nodes are attached to boxes containing their child map indices. Since node 4 is completely inside node 1, it does not have a direct connection with the root node, but becomes a leaf of node 1. Nodes 1, 2, 3 and 5 all have regions that do not overlap with any other nodes, therefore they all have direct connections with the root node. Since map 5 (map 5 shown in FIG. 4) does not overlap with any other maps, it does not have connections with any other node and it becomes a leaf node of the root node. Node 1 overlaps with maps 2 and 3 (maps 2 and 3 shown in FIG. 4), and therefore nodes 2 and 3 hang below node 1. Since nodes 2 and 3 partially overlap each other outside node 1, node 3 connects to node 2 from below. The order of the OMTS is from top to bottom and from left to right in an ascending order according to their corresponding map index.

Figure 7:
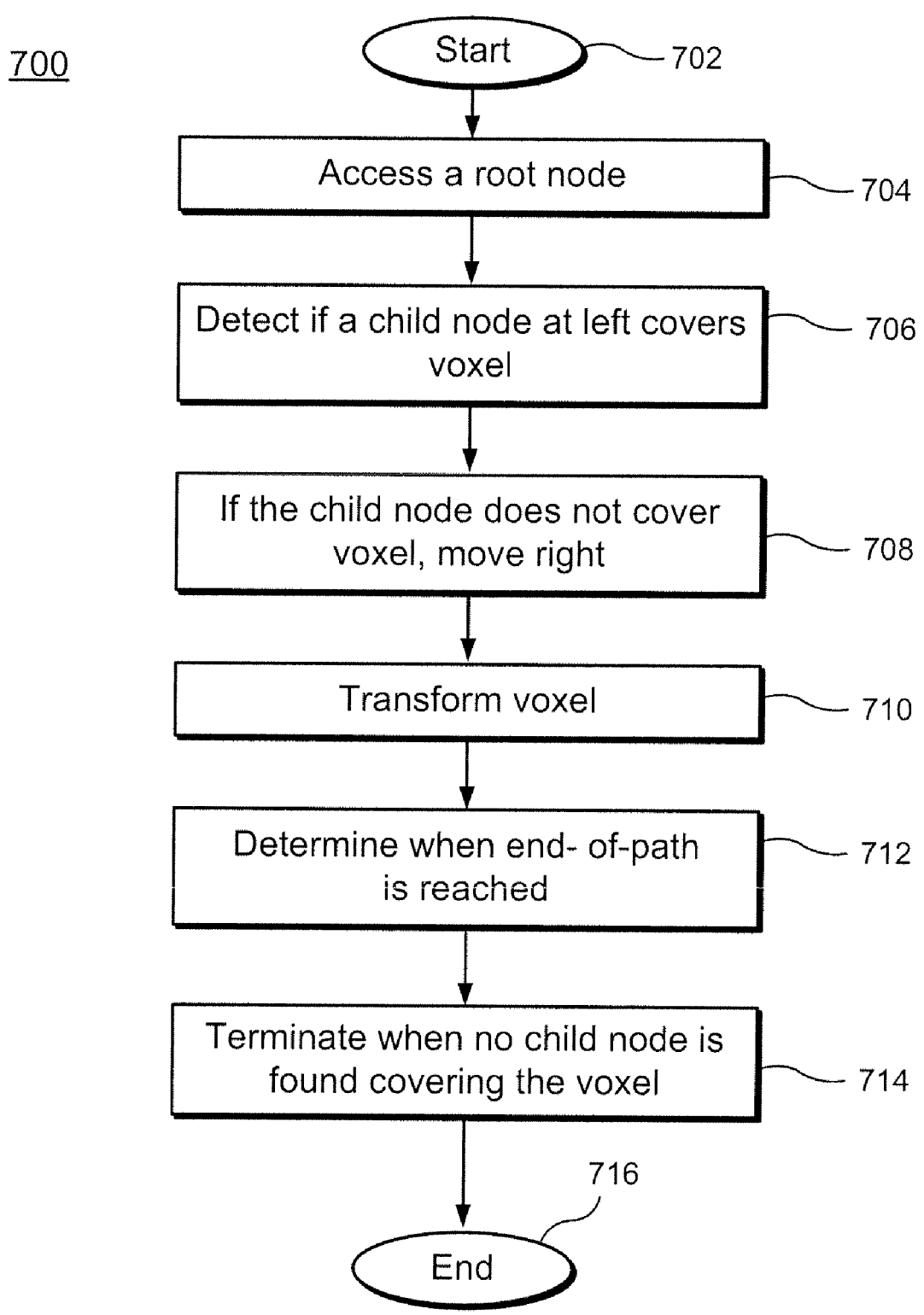
FIG. 7 shows a flowchart for traversing an ordered-map tree structure according to yet another embodiment of the present invention.
Figure 8:
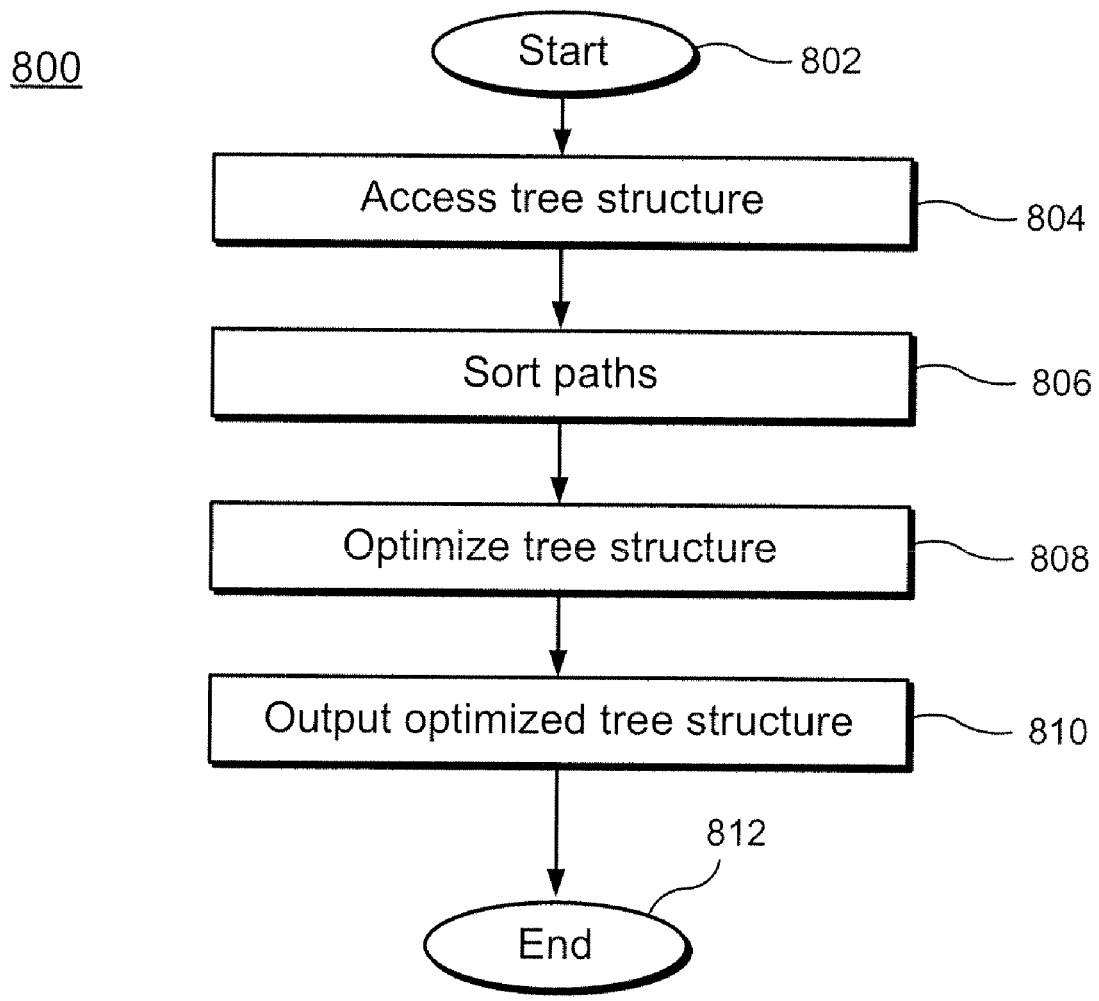
FIG. 8 shows a flowchart for optimizing an ordered-map tree structure according to yet another embodiment of the present invention.

Another embodiment of the present invention, illustrated in FIG. 7, is directed to a system and a method of traversing the ordered map tree structure. FIG. 7 shows a process 700, which is for example, a series or steps, or program code or algorithm stored on an electronic memory or computer-readable medium, used to traverse the ordered map tree structure in step 506 of process 500 shown in FIG. 5. The process may also be a module that includes an electronic memory, with program code stored thereon to perform the functionality. This memory is a structural article. Process 700 begins in step 702. A root node of the tree structure is accessed, as shown in step 704. In step 706, it is detected whether a child node on a left side has a bounding box covering a voxel. When the bounding box of the child node does not cover the voxel, process 700 moves right until a child node is found that covers the voxel, as shown in step 708. The voxel is transformed according to a transformation map at said child node, as shown in step 710. In step 712, it is determined when an end-of-path is reached by evaluating child nodes of said child node. Step 714 terminates process 700 when no child node is found with a deformation map that covers the voxel. Step 716 is an end step.

The following example illustrates how process 700 shown in FIG. 7 traverses an ordered map tree structure (OMTS). A linear search is performed in order to traverse the OMTS during deformation for every voxel (see FIG. 10a). The linear search is performed as follows: Starting from the root node, first check the child node on the left. If a child node whose bounding box does not cover the position of the transforming voxel, move to the next node on the left until a node is found which covers the transforming voxel. If no map node is found, the deformation process is stopped since there is no map to cover the voxel. After deforming the voxel by the covering node, check a child node list from left to right, level by level, until an end-of-path is reached. Then the deformation for the transforming voxel is completed. Afterwards, switch to the next voxel to be deformed by using the same linear search method. This process is repeated for all voxels until the entire original volume is deformed into reference volume space.

Yet another embodiment of the present invention, illustrated in FIG. 8, is directed to a system and a method of optimizing the ordered map tree structure. FIG. 8 shows a process 800, which is for example, a series or steps, or program code or algorithm stored on an electronic memory or computer-readable medium, which may be used to optimize the ordered map tree structure before accessing it in step 504 of process 500 shown in FIG. 5. The process may also be a module that includes an electronic memory, with program code stored thereon to perform the functionality. This memory is a structural article. Process 800 begins in step 802. An ordered map tree structure containing a set of deformation maps for an original volume is accessed, as shown in step 804. Paths of the ordered map tree structure are sorted so that a path with a highest probability is listed first in the ordered map tree structure, as shown in step 806.

An optimized ordered map tree structure is generated, as shown in step 808, and the optimized map tree is output, as shown in step 810. As a result of applying process 800 to an ordered map tree structure, deformation map searching time is reduced for each voxel in the original volume, since the paths with a higher probability of containing a voxel position are listed first, and hence get searched first. The method is terminated as shown in end step 812.

The following example illustrates how an ordered map tree structure (OMTS) may be optimized using process 800 shown in FIG. 8. The ordered map tree structure may be optimized for faster traversal (see FIG. 10b). Using the example from FIGS. 4 and 10a, the complete deformation sequences (i.e., the paths of the OMTS) can be listed as: <1>; <1, 2>; <1, 2, 3>; <1, 3>; <1, 4>; <2>; <2, 3>; <3>; <5>; and <0>, where <0> is a special path for those voxels that are not covered by any deformation maps. There are a total of 10 paths, where each path defines a complete deformation sequence. Between the paths there are no shared regions. Therefore, to deform a particular voxel from the original volume to the reference volume, only one path needs to be followed for a particular voxel. The OMTS provides an efficient way to find which path covers the transforming voxel. For those paths that do not share maps, the paths are sorted so that a path with a highest probability (proportional to its size that overlaps with its parent map) is checked first.

To optimize the OMTS constructed above and shown in FIG. 10a, the following example is followed: The non-leaf node's children are grouped into different components. Each component consists of the sibling child maps which overlap each other. In other words, the maps between different components have no shared region. Then, swap the deformation order between the different components since they define different regions independently. The order inside a component is preserved due to the deformation dependency. In FIG. 10a, there are three non-leaf nodes: root node, node 1, and node 2. The root node has two components {1,2,3} and {5}; node 1 also has two components {2,3} and {4}; and node 2 has only one component {3}.

After constructing the original OMTS (FIG. 10a), the non-leaf node's child list is sorted in descending order so that the component covering the most volume size in its parent map will be searched first. For example, in node 2 of FIG. 10a, component {4} covers a larger region in the parent map 1 than component {2,3} (see FIG. 4). Therefore, the order between components {2,3} and {4} is swapped in the optimized OTMS (see FIG. 10b).

From the optimized OMTS, the paths from different components with the most probability will be searched first. In the above example, the path <1,4> will be searched before paths <1,2> and <1,3>, which reduces the amount of map bounding box checking since map 4 covers more regions than maps 2 and 3 (shown in FIG. 4) in their parent map 1 (shown in FIG. 4).

With path sorting based on the size of the overlap region with the parent node, an optimal search path is found to complete the deformation. This optimized OMTS provides the minimal number of bounding box checking for the majority of voxels in the parent map during deformation. FIG. 10b shows the final optimized OMTS for the above example.

FIG. 9 shows sample pseudocode for generating the Ordered Map Tree Structure (OMTS) from the set of deformation maps and the map sequence. This sample pseudocode is illustrative of but one manner in which the present invention may be implemented, and is not intended to limit the scope or spirit of the present invention. This program code may be stored in memory module 900, as shown in FIG. 2.

The OMTS of the present invention provides a faster method to traverse a complete map sequence when deforming a given voxel. The OMTS lists all independent deformation sequences (paths). By checking the proper coverage of the paths, the right path can be found without searching through the boundary conditions of all deformation maps. By proper sorting, the search effort in the optimized OMTS is minimized. Since the deformation is applied individually to all voxels of the original volume, the amount of time saved is significant, which makes "on-the-fly" deformation possible, even for large volumes.

Figure 11:
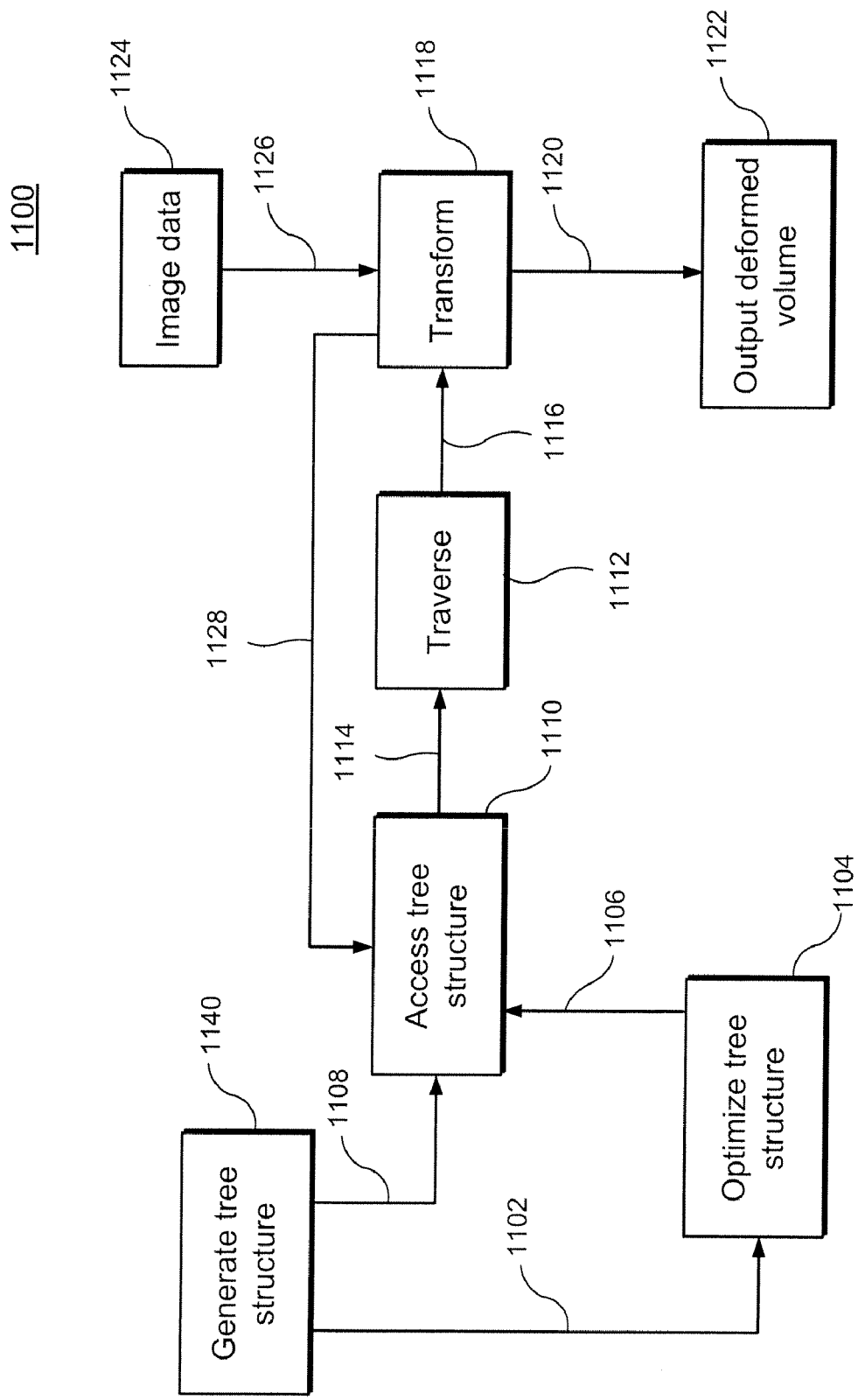
FIG. 11 shows modules, or processing facilities adapted to perform the described functionality of the present invention.

FIG. 11 shows processing modules or facilities 1100 to implement the functionality of the present invention. Each module of FIG. 11 includes processing capability to perform the associated function. Module 1140 is used to generate a tree structure. This generation is described in detail in relation to FIG. 6. Lines 1102 and 1108 show that the tree structure can be provided to optimization module 1104 and/or access module 1110, respectively. Optimization of the tree structure occurs in module 1104. The steps used to perform this optimization are described in relation to FIG. 8. Once the tree structure has been optimized, line 1106 shows that the optimized tree structure is provided to access module 1110.

As shown in FIG. 11, the tree structure generated in module 1140 may be provided to access module 1110 (via line 1108). The access module 1110 has processing functionality to access the tree structure, either from generation module 1140 or optimization module 1104. Once the tree structure has been optimized, line 1114 shows that traverse module 1112 is reached. The traverse module 1112 and the transform module 1118, reached via line 1116, perform the functionality described in detail in relation to FIG. 7. Line 1128 shows that after a transform function is performed, the tree structure may be accessed (module 1110). Thus, the transform function is interactive.

Image data module 1124 provides image data to transform module 1118, as shown by line 1126. The image data may include volume data. Once the entire volume has been transformed (module 1118) a deformed volume is output, as shown by output module 1122.

It will be appreciated from the above that the invention may be implemented as computer software, which may be supplied on a storage medium or via a transmission medium such as a local-area network or a wide-area network, such as the Internet.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method implemented in a processor to perform volume deformation, the method comprising:
   accessing a map tree for a set of deformation maps;
   traversing the map tree for each voxel in an original volume;
   transforming each voxel according to each deformation map corresponding to a node of the map tree until the entire original volume is deformed into reference volume space; and
   generating an ordered map tree for the set of deformation maps by identifying a root node of a bounding box, the bounding box being a union of the root node's descendants.

2. The method implemented in a processor to perform according to claim 1, wherein the step of generating the ordered map tree further comprises:

identifying child nodes for each node, the child nodes being ordered so that a left child is applied before a corresponding right child, wherein each child node contains a deformation map and a corresponding bounding box, wherein each path originating from the root node corresponds to a complete deformation map sequence, and wherein when a portion of two deformation maps overlap, the deformation map having a lower priority is a child of the deformation map having a higher priority.

3. The method implemented in a processor to perform according to claim 1, further comprising:

optimizing the map tree for the set of deformation maps.

4. The method implemented in a processor to perform according to claim 3, wherein the step of optimizing the map tree further comprises:

accessing the ordered map tree containing the set of deformation maps for an original volume;

sorting paths of the ordered map tree so that a path with a highest probability is listed first in the ordered map tree; and outputting an optimized ordered map tree, thereby reducing deformation map searching time for each voxel in the original volume.

5. The method implemented in a processor to perform according to claim 1, wherein the step of traversing the map tree further comprises:

accessing a root node of the map tree;

detecting whether a child node on a left side has a bounding box covering a voxel;

when the bounding box of the child node does not cover the voxel, moving right until a child node is found that covers the voxel;

transforming the voxel according to a transformation map at said child node;

determining when an end-of-path is reached by evaluating child nodes of said child node; and terminating when no child node is found with a deformation map that covers the voxel.

6. An apparatus utilizing a processor for volume deformation, comprising:

means for accessing a map tree for a set of deformation maps;

means for traversing the map tree for each voxel in an original volume;

means for transforming each voxel according to each deformation map corresponding to a node of the map tree until the entire original volume is deformed into reference volume space;

means for generating an ordered map tree for the set of deformation maps; and means for identifying a root node of a bounding box, the bounding box being a union of the root node's descendants.

7. The apparatus utilizing a processor according to claim 6, wherein the means for generating the ordered map tree further comprises;

means for identifying child nodes for each node, the child nodes being ordered so that a left child is applied before a corresponding right child, wherein each child node contains a deformation map and a corresponding bounding box, wherein each path originating from the root node corresponds to a complete deformation map sequence, and wherein when a portion of two deformation maps overlap, the deformation map having a lower priority is a child of the deformation map having a higher priority.

8. The apparatus utilizing a processor according to claim 6, further comprising:

means for optimizing the map tree for the set of deformation maps.

9. The apparatus utilizing a processor according to claim 8, wherein the means for optimizing the map tree further comprises:

means for accessing the ordered map tree containing a set of deformation maps for an original volume;

means for sorting paths of the ordered map tree so that a path with a highest probability is listed first in the ordered map tree; and means for outputting an optimized ordered map tree, thereby reducing deformation map searching time for each voxel in the original volume.

10. The apparatus utilizing a processor according to claim 6, wherein the means for traversing the map tree further comprises:

means for accessing a root node of the map tree;

means for detecting whether a child node on a left side has a bounding box covering a voxel;

means for deciding when the bounding box of the child node does not cover the voxel;

means for moving right until a child node is found that covers the voxel based on a decision from the means for deciding;

means for transforming the voxel according to a transformation map at said child node;

means for determining when an end-of-path is reached by evaluating child nodes of said child node; and means for terminating when no child node is found with a deformation map that covers the voxel.

11. A system for volume deformation, comprising:

at least one processor; and at least one memory, coupled to the at least one processor, storing program code adapted to cause the processor to perform a process comprising the steps of:

accessing a map tree for a set of deformation maps;

traversing the map tree for each voxel in an original volume;

transforming each voxel according to each deformation map corresponding to a node of the map tree until the entire original volume is deformed into reference volume space; and generating an ordered map tree for the set of deformation maps by identifying a root node of a bounding box, the bounding box being a union of the root node's descendants.

12. The system according to claim 11, wherein the at least one memory stores program code adapted to cause the processor to perform a process comprising the steps of:

identifying child nodes for each node, the child nodes being ordered so that a left child is applied before a corresponding right child, wherein each child node contains a deformation map and a corresponding bounding box, wherein each path originating from the root node corresponds to a complete deformation map sequence, and wherein when a portion of two deformation maps overlap, the deformation map having a lower priority is a child of the deformation map having a higher priority.

13. The system according to claim 11, wherein the at least one memory stores program code adapted to cause the processor to perform a process comprising the additional step of:

optimizing the map tree for the set of deformation maps.

14. The system according to claim 13, wherein the at least one memory stores program code adapted to cause the processor to perform a process comprising the additional steps of:
- accessing the ordered map tree containing a set of deformation maps for an original volume;
- sorting paths of the ordered map tree so that a path with a highest probability is listed first in the ordered map tree; and
- outputting an optimized ordered map tree, thereby reducing deformation map searching time for each voxel in the original volume.

15. The system according to claim 11, wherein the at least one memory stores program code adapted to cause the processor to perform a process comprising the additional steps of:
- accessing a root node of the map tree;
- detecting whether a child node on a left side has a bounding box covering a voxel;
- when the bounding box of the child node does not cover the voxel, moving right until a child node is found that covers the voxel;
- transforming the voxel according to a transformation map at said child node;
- determining when an end-of-path is reached by evaluating child nodes of said child node; and
- terminating when no child node is found with a deformation map that covers the voxel.

* * * * *